US009287919B2

(12) United States Patent
Harper

(10) Patent No.: US 9,287,919 B2
(45) Date of Patent: Mar. 15, 2016

(54) MULTI-BAND ISOLATOR ASSEMBLY

(71) Applicant: Microsoft Corporation, Redmond, WA (US)

(72) Inventor: Marc Harper, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 142 days.

(21) Appl. No.: 14/188,513

(22) Filed: Feb. 24, 2014

(65) Prior Publication Data

US 2015/0244411 A1  Aug. 27, 2015

(51) Int. Cl.
*H01Q 1/52* (2006.01)
*H04B 1/44* (2006.01)
*H04B 1/401* (2015.01)
*H01Q 1/24* (2006.01)
*H01Q 9/14* (2006.01)

(52) U.S. Cl.
CPC ............... *H04B 1/44* (2013.01); *H01Q 1/243* (2013.01); *H01Q 1/521* (2013.01); *H01Q 9/14* (2013.01); *H04B 1/401* (2013.01)

(58) Field of Classification Search
CPC ......... H01Q 1/243; H01Q 9/14; H01Q 1/521; H04B 1/44; H04B 1/401
USPC .......................... 343/841, 722, 702
See application file for complete search history.

(56) References Cited

U.S. PATENT DOCUMENTS

| 5,485,167 | A  |   | 1/1996 | Wong et al. | |
|---|---|---|---|---|---|
| 6,624,789 | B1 | * | 9/2003 | Kangasvieri | H01Q 1/243 343/702 |
| 8,362,960 | B2 |   | 1/2013 | Mumbru et al. | |
| 8,552,913 | B2 | * | 10/2013 | Ayatollahi | H01Q 1/243 343/702 |
| 8,816,921 | B2 | * | 8/2014 | Ayatollahi | H01Q 1/243 343/702 |
| 8,922,488 | B2 | * | 12/2014 | Fahlander | G06F 3/03546 345/163 |
| 8,933,842 | B2 | * | 1/2015 | Ayatollahi | H01Q 1/243 343/700 MS |
| 2005/0093750 | A1 |   | 5/2005 | Vance | |
| 2008/0258991 | A1 |   | 10/2008 | Montgomery et al. | |
| 2009/0027286 | A1 |   | 1/2009 | Ohishi et al. | |
| 2010/0053022 | A1 |   | 3/2010 | Mak et al. | |
| 2011/0298666 | A1 |   | 12/2011 | Kim et al. | |
| 2013/0016024 | A1 |   | 1/2013 | Shi et al. | |
| 2013/0050031 | A1 | * | 2/2013 | Zhu | H01Q 1/523 343/702 |
| 2013/0069842 | A1 |   | 3/2013 | Lee et al. | |
| 2013/0076579 | A1 |   | 3/2013 | Zhang et al. | |
| 2013/0335280 | A1 | * | 12/2013 | Chen, III | H01Q 21/28 343/725 |

OTHER PUBLICATIONS

International Searching Authority, U.S. Patent and Trademark Office, International Search Report for PCT/US2015/016721, dated May 29, 2015, 5 pages.
International Searching Authority, U.S. Patent and Trademark Office, Written Opinion for PCTUS2015/016721, mailed May 29, 2015, 5 pages.

(Continued)

*Primary Examiner* — Khai M Nguyen

(74) *Attorney, Agent, or Firm* — Judy Yee; Jeremy Snodgrass; Micky Minhas

(57) ABSTRACT

An isolator assembly is configured to provide isolation in each of multiple non-overlapping frequency bands and includes a selection network to select one of the multiple non-overlapping frequency bands for an isolation operation. During the isolation operation, the isolator assembly prevents signal coupling between antennas that are positioned on opposite sides of the isolator assembly.

20 Claims, 11 Drawing Sheets

(56) References Cited

OTHER PUBLICATIONS

Lin, et al., "A Compact Planar Near Field Resonant Parastic (NFRP) Antenna for MIMO Applications", In IEEE International Symposium on Antennas and Propagation, Jul. 3, 2011, 4 pages.

Rowell, et al., "Multiple Frequency Band and High Isolation Mobile Device Antennas Using a Capacitive Slot", In IEEE Transactions on Antennas and Propagation, vol. 60, Issue 8, Aug. 2012, 7 pages.
International Search Authority, U.S. Patent and Trademark Office, Written Opinion of the International Preliminary Examining Authority, mailing date: Jan. 26, 2016, 6 pages.

* cited by examiner

MULTI-BAND ISOLATOR ASSEMBLY

BACKGROUND

Antennas for computing devices present challenges relating to receiving and transmitting radio waves at one or more select frequencies. These challenges are magnified by the current trend to include several different antennas operating at various frequencies in a single computing device. If not properly spaced from one another, antenna signals can couple together and reduce system performance. Small computer electronics offer fewer antenna spacing possibilities, limiting design options.

SUMMARY

Implementations described and claimed herein may address the foregoing by providing an isolator assembly including one or more parasitic structures that resonate to provide isolation in multiple non-overlapping frequency bands.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
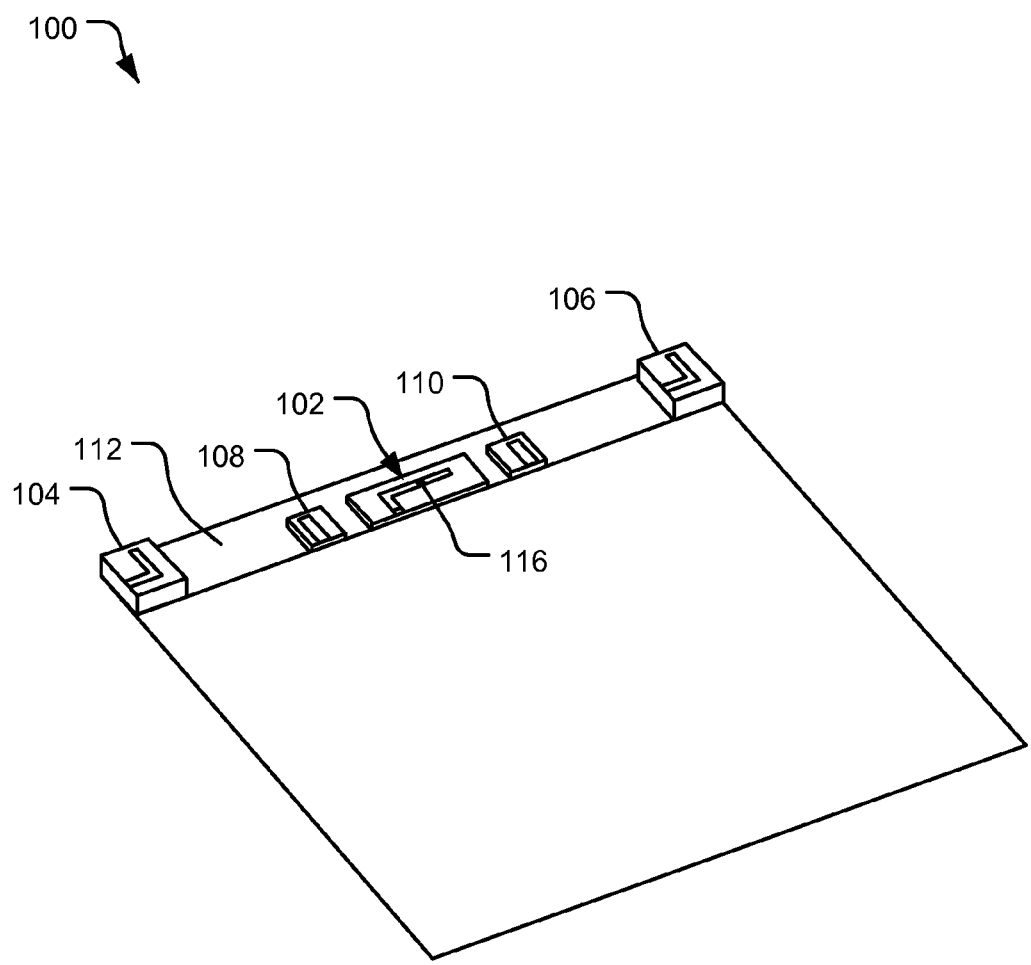
FIG. 1 illustrates an example isolator assembly positioned on a surface of an electronic device.

FIG. 1 illustrates an example isolator assembly 102 positioned on a surface 112 of an electronic device 100. The electronic device 100 may be without limitation a tablet computer, laptop, mobile phone, personal data assistant, cell phone, smart phone, Blu-Ray player, gaming system, wearable computer, or any other device including wireless communications circuitry for transmission of an RF carrier wave.

The electronic device 100 includes a number of antennas (e.g., RF antennas) positioned on both sides of the isolator assembly 102. In particular, the isolator assembly 102 is positioned between a first outer antenna 104 and a second outer antenna 106 and also between a first inner antenna 108 and a second inner antenna 110. Of the antennas shown, at least one antenna operates in a different frequency band than the others. For example, the first inner antenna 108 may operate in a different frequency band than the second inner antenna 110, the first outer antenna 104, and the second outer antenna 106. Alternatively, the electronic device 100 may include two or more "pairs" of identical antennas, with the isolator assembly 102 is positioned between the antennas of each pair. This configuration may be used, for example, in MIMO telecommunications systems. Other implementations are disclosed herein and otherwise contemplated.

In one implementation, the first inner antenna 108 and the outer antenna 110 are substantially identical and operate in a first frequency band, while the first outer antenna 104 and the second outer antenna 106 are substantially identical and operate in a second frequency band. For example, the first inner antenna 108 and the second inner antenna 110 may receive and send radio signals over a wireless local area network (e.g., "WiFi") in a frequency band of approximately 2400 to 5800 MHz. In the same or another implementation, the first outer antenna 104 and the second outer antenna 106 receive and send radio signals in a frequency band allocated for cellular transmissions, or approximately 0.7 to 2.7 GHz.

The isolator assembly 102 is shown positioned along an edge region of the surface 112, which may be either an inner or an outer surface of the electronic device 100. The surface 112 may be a portion of a front, back, or side face of the electronic device 100. In some implementations, the isolator assembly 102 is positioned in a region other than an edge region of the surface 112.

When an antenna is in use on the surface 112 and is actively receiving or transmitting a signal, a surface current may form on the surface 112. Without effective isolation, the surface current can cause a "coupling" to occur between signals emanated from or received by two or more antennas that operate in the same or an overlapping frequency band. For example, surface current generated by an outgoing transmission of the first inner antenna 108 may "couple to" and thus, interfere with, functionality of the second inner antenna 110. As a result of this coupling, a speed of one or more links may be reduced or system performance may be otherwise hindered.

Antenna coupling can be prevented or reduced by effectively isolating antennas operating in overlapping frequency ranges from one another. Isolation can be achieved via strategic placement of the antennas along the surface 112 or by use of an isolator, such as the isolator assembly 102. To isolate by strategic placement, two antennas operating in an overlapping frequency band are, in one implementation, separated from one another by about ¼ of the wavelength corresponding to the overlapping frequency band. However, ¼wavelength distances are not always feasible, particularly in smaller electronic devices with limited surface area. Placement challenges are especially prominent for antennas operating in lower frequencies with longer wavelengths.

The isolator assembly 102 provides isolation that allows for two antennas operating in a first frequency band to be physically separated from one another on the surface 112 by less than ¼ of the wavelength corresponding to the first frequency band. In addition, the isolator assembly 102 provides isolation in a second frequency band that does not overlap the first frequency band.

A selection network 116 performs a selection operation by selecting or deselecting one or more isolation frequency bands for an isolation operation. In the case of FIG. 1, the selection network 116 selects between the first frequency band and the second frequency band. Consequently, surface current oscillating in the selected frequency band is blocked by the isolator assembly 102 and prevented from substantially coupling between the first inner antenna 108 and the second inner antenna 110.

The selection network 116 includes circuitry that selectively allows or disallows current passage based on current frequency. One example of a selection network is a choke element that presents an open circuit at a first frequency and a short circuit at a second frequency. Another example of a selection network 116 is a circuit that presents a high impedance at certain frequencies, effectively disallowing current passage at such frequencies. Other implementations are also contemplated.

In some implementations, the isolator assembly 102 includes multiple isolator elements, each operational within a different, non-overlapping frequency band. One or more selection networks select between the multiple isolator elements based on a frequency of a received surface current. Individual isolator elements in the isolator assembly may each provide isolation in two non-overlapping frequency bands.

Although FIG. 1 illustrates an isolator assembly 102 that isolates in two non-overlapping frequency bands, other implementations may provide for isolation in three or more frequency bands.

Figure 2:
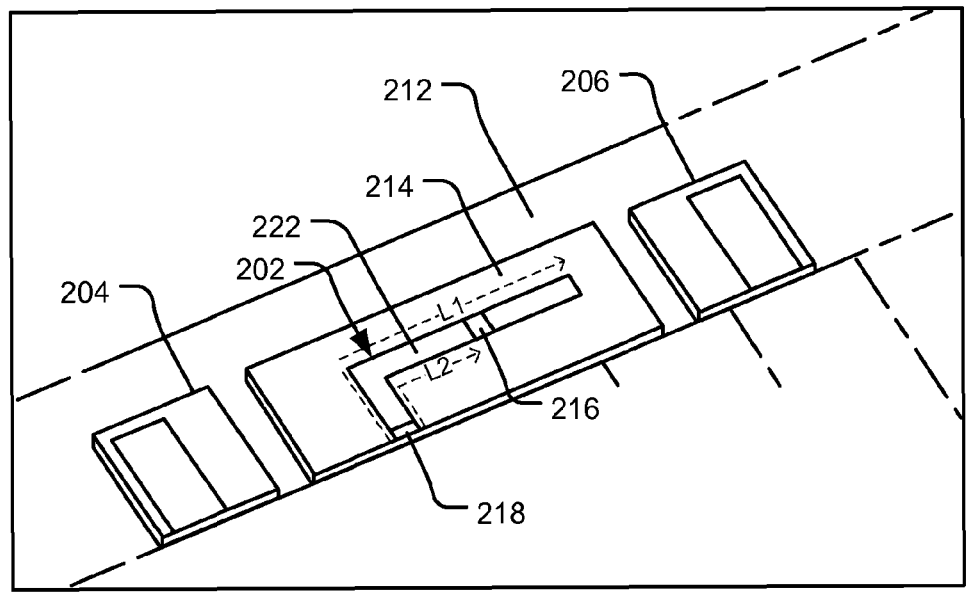
FIG. 2 illustrates an example isolator assembly positioned between two antennas on a surface of an electronic device.

FIG. 2 illustrates an example isolator assembly 202 positioned between two antennas 204 and 206 on a surface 212 of an electronic device 200. Although not shown, the surface 212 may include additional antenna elements positioned on one or both sides of the isolator assembly 202. At least one antenna on the surface 212 emanates a radio signal in a first frequency band F1 and at least one antenna on the surface 212 emanates a radio signal in a second frequency band F2, which does not overlap the first frequency band. For example, the antennas 204 and 206 may operate in a WiFi frequency band, while another pair of antennas (not shown) positioned on opposite sides of the isolator assembly operate in a cellular frequency band. Other implementations are also contemplated.

The isolator assembly 202 includes an isolation element 222 surrounded by an insulating (e.g., dielectric) material 214. The isolation element 222 is an AC-grounded, conductive, parasitic element that is excited into a state of resonance by surface current oscillating in either of the frequency bands F1 or F2. The isolation element 222 is shown as L-shaped; however, other shapes are also contemplated. In one implementation, the isolation element 222 is a component printed on a dielectric medium and soldered to the surface 212.

An end-to-end length L1 of the isolation element 222 is associated with the wavelength of a wave having the frequency F1. In one implementation, the isolation element 222 has an end-to-end distance L1 that is substantially equal to ¼ of the distance c/F1, where c is the speed of light. In FIG. 2, an inductor 218 is included on a first end of the isolation element 222 to increase the resonant frequencies F1 and F2 of the isolation element 222. This allows for more compact antenna arrangements. Thus, the end-to-end length L1 of the isolation element 222 is less than ¼ of c/F1.

Figure 3:
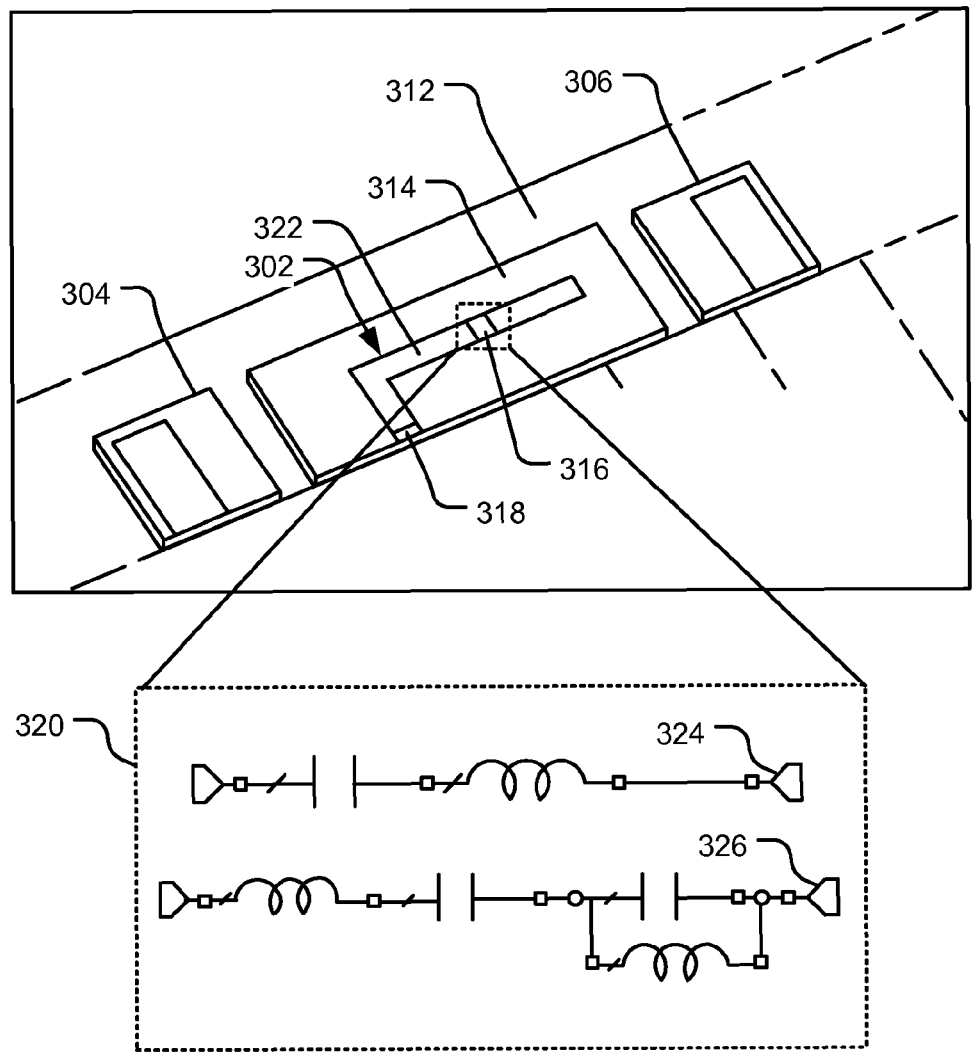
FIG. 3 illustrates an example isolator assembly positioned between two antennas on a surface of an electronic device.

A distance L2 is measured between a first end of the isolation element 222 and a choke element 216 (i.e., an example selection network). The distance L2 is associated with the wavelength of a wave having the frequency F2. In an implementation not including the inductor 218, the distance L2 is substantially equal to ¼ of c/F2. In FIG. 3, the distance L2 is less than ¼ of c/F2. Other implementations are also contemplated.

The choke element 216 includes circuitry that presents an open circuit for surface current in the first frequency band F1 and presents short circuit for surface current of the second frequency band F2. In this manner, the effective length of the isolation element 222 is different depending on whether the radiating frequency is at F1 or F2.

In operation, the isolator assembly 202 prevents passage of surface currents with an oscillation frequency in the range of either F1 or F2 by resonating at such frequencies. When one or more antennas on the surface 212 are emanating radio signals in the frequency bands F1 or F2, surface current traveling between the antennas 204 and 206 is effectively terminated on the isolation element 202. In one example implementation, F1 is a frequency used for cellular transmissions and F2 is a frequency in the WiFi spectrum.

FIG. 3 illustrates an example isolator assembly 302 positioned between two antennas 304 and 306 on a surface 312 of an electronic device 300. Although not shown, the surface 312 may include additional antenna elements positioned on one or both sides of the isolator assembly 302. At least one antenna on the surface 312 emanates a radio signal in a first frequency band F1 and least one antenna on the surface 312 emanates a radio signal in a second frequency band F2 different from the first frequency band F1.

The isolator assembly 302 includes an isolation element 322 surrounded by an insulating material 314. The isolation element 322 is an AC-grounded, conductive, parasitic element including a choke element 316 and an inductor 318 on a first end. The isolation element 322 functions to prevent surface current oscillating at a frequency within F1 or F2 from passing along the surface 312 between the antenna 304 and the antenna 306. The choke element 316 includes circuitry that presents an open circuit for surface current in the first frequency band F1 and a short circuit for surface current in the second frequency band F2. Example circuitry for the choke element 316 is shown in exploded view 320. In particular, two different example circuits 324 and 326 are shown. A variety of other implementations are contemplated.

Figure 4:
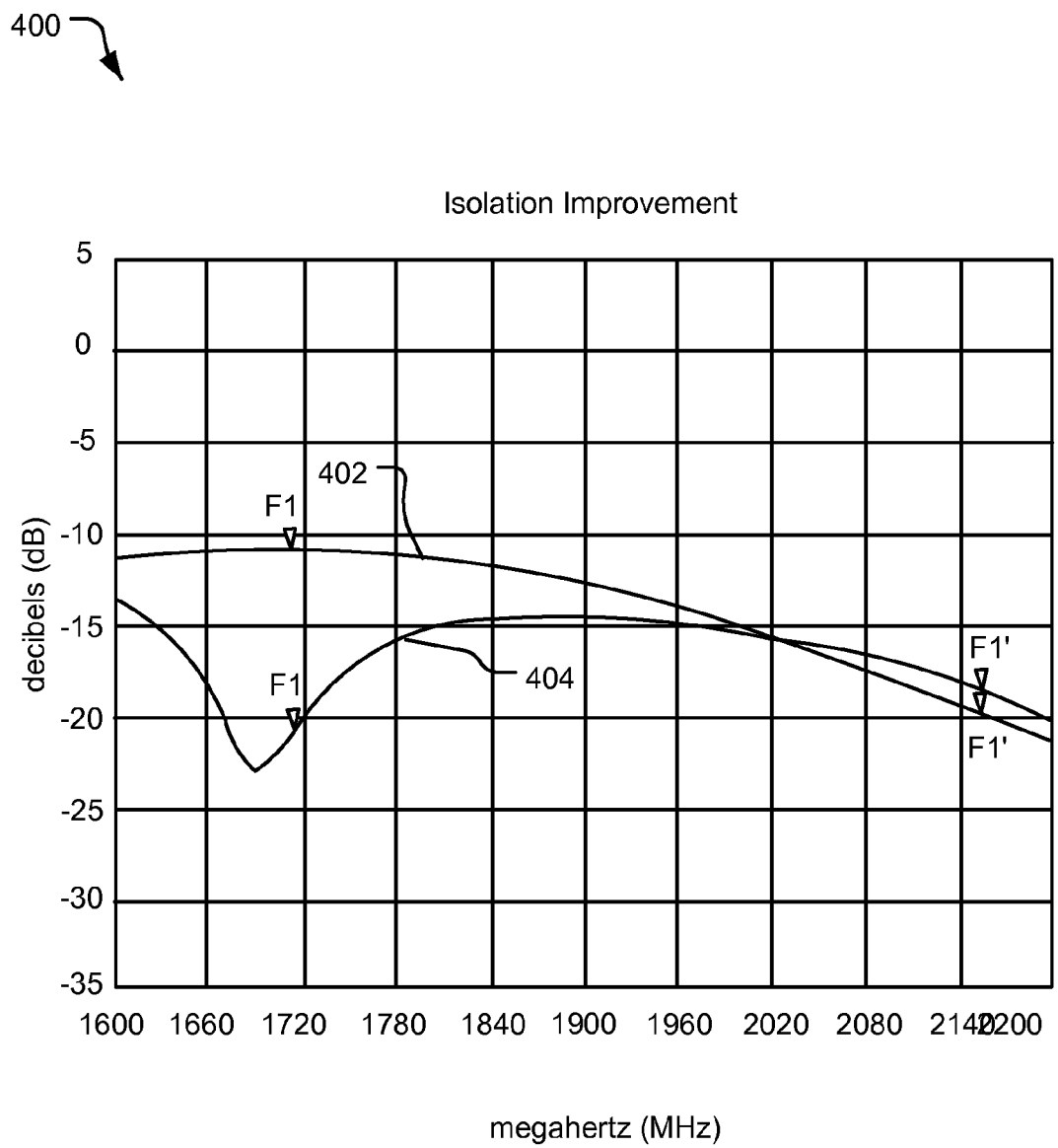
FIG. 4 illustrates a plot of isolation achieved by an example isolator assembly including an isolator element that resonates in two different non-overlapping frequency bands.

FIG. 4 illustrates a plot 400 of isolation improvement achieved via insertion of an example isolator assembly between two antennas on a surface. The isolator assembly includes an isolator element that resonates in two different non-overlapping frequency bands (e.g., as shown in FIGS. 2 and 3). The isolator element is an AC-grounded, conductive, parasitic element with an end-to-end length L1 associated with a first resonant frequency band of about 1900 MHz. The isolator element also includes a choke element that divides a second length L2 from L1, where L2 is associated with a second resonant frequency band of 2450 MHz (not shown on plot). The choke element presents a short circuit for a current oscillating at a frequency within the second frequency band.

A first plot line 402 illustrates isolation achieved without use of the isolator assembly between the two antennas. A second plot line 404 illustrates isolation achieved between the two antennas using the isolator assembly. Points F1 and F1' on each plot line indicate lower and upper bounds of a transmission bandwidth of one of the two antennas. With the isolator assembly in place, an isolation improvement is observed with a maximum improvement of about 10 dB observed at a lower end of the bandwidth of interest.

Figure 5:
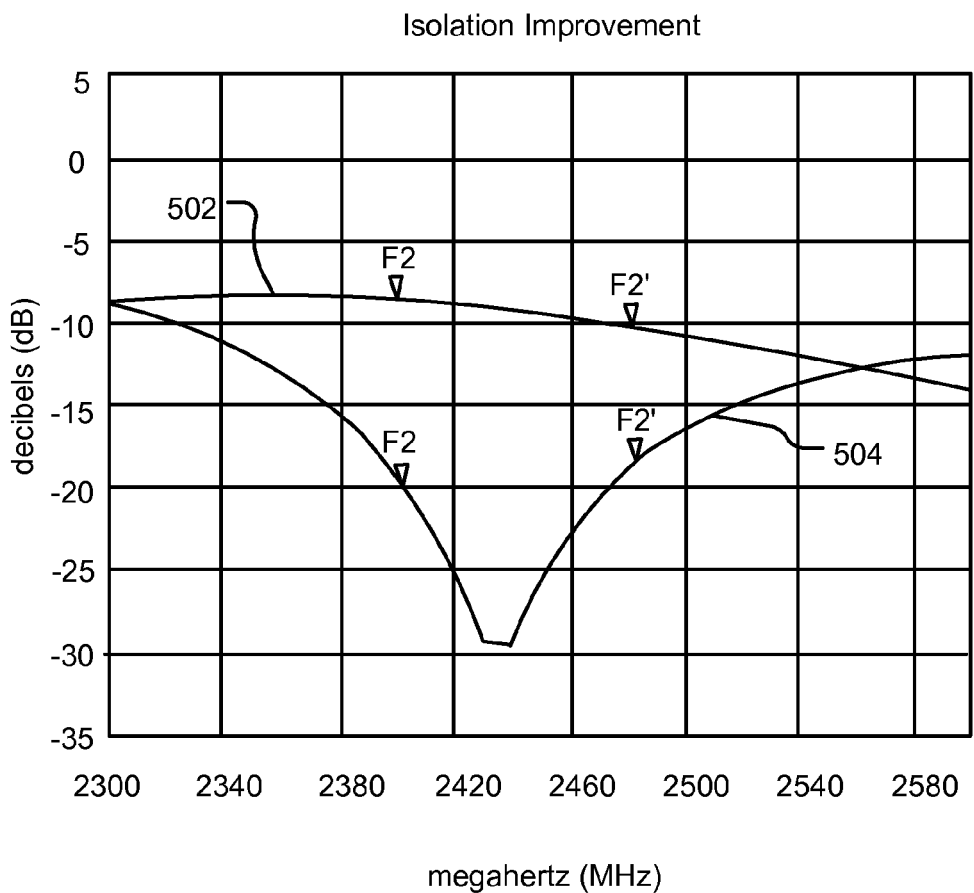
FIG. 5 illustrates another plot of isolation achieved by an example isolator assembly including an isolator element that resonates in two different non-overlapping frequency bands.

FIG. 5 illustrates a plot 500 of isolation achieved by an example isolator assembly including an isolator element that resonates in two different non-overlapping frequency bands (e.g., as shown in FIGS. 2 and 3). The isolator element is an AC-grounded, conductive, parasitic element with an end-to-end length L1 associated with a first resonant frequency band of 1900 MHz. The isolator element also includes a choke element that divides a second length L2 from L1, where L2 is associated with a second resonant frequency band of about 2450 MHz. The choke element presents a short circuit for a current oscillating at a frequency within the second frequency band.

A first plot line 502 illustrates isolation achieved without use of the isolator assembly between the two antennas. A second plot line 504 illustrates isolation achieved between the two antennas using the isolator assembly. Points F2 and F2' on each plot line indicate lower and upper bounds of a transmission bandwidth of one of the two antennas. With the isolator assembly in place, an isolation improvement is observed with a maximum improvement of about 20 dB observed between 2420 MHz and 2460 MHz.

Figure 6:
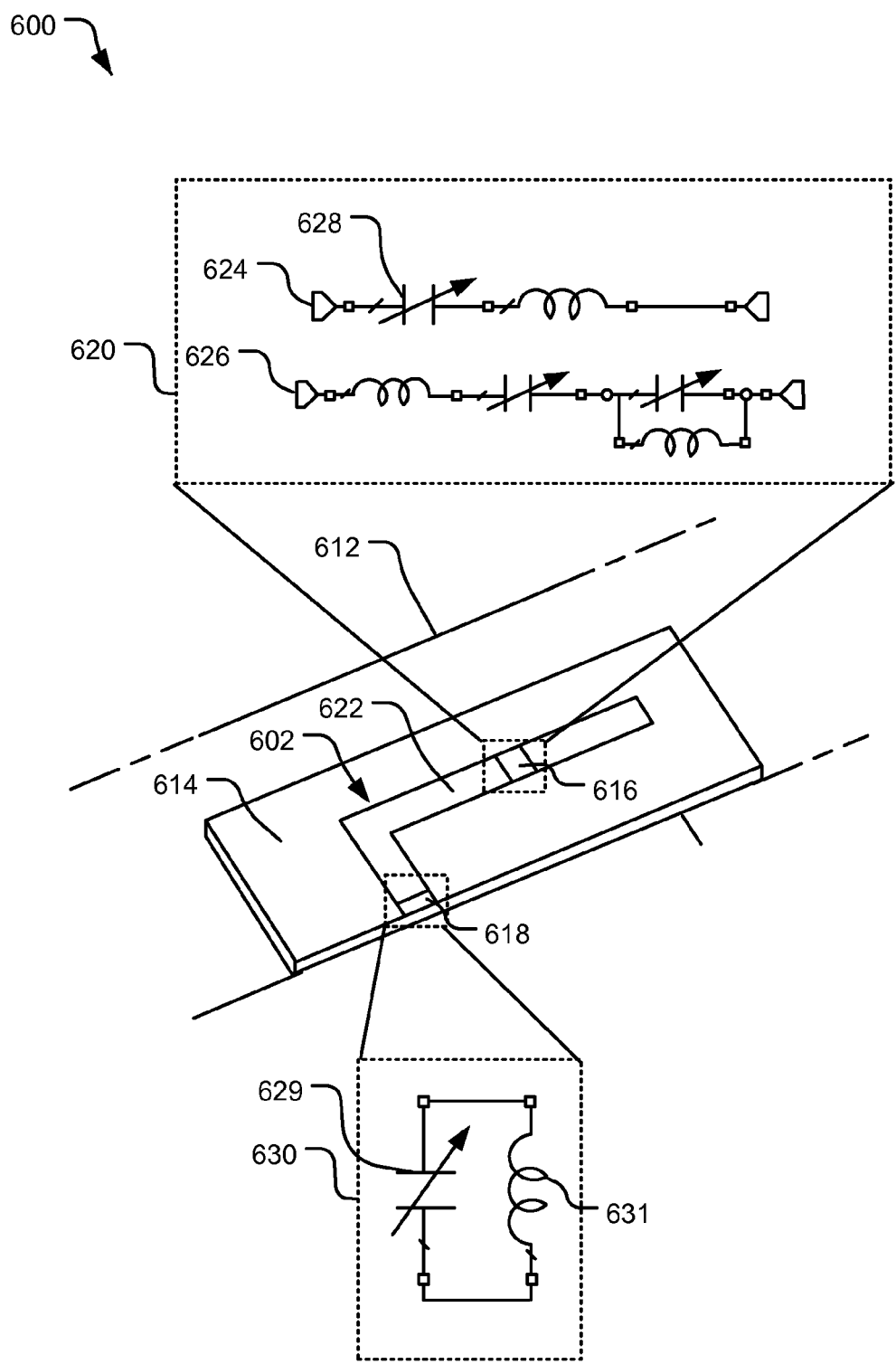
FIG. 6 illustrates an example isolator assembly positioned between two or more antennas on a surface of an electronic device.

FIG. 6 illustrates another example isolator assembly 602 positioned between two or more antennas (not shown) on a surface 612 of an electronic device 600. At least one antenna on the surface 612 emanates a radio signal in a first frequency band F1 and at least one antenna on the surface 612 emanates a radio signal in a second frequency band F2 that does not overlap with the first frequency band F1.

The isolator assembly 602 includes an isolation element 622 surrounded by an insulating material 614. The isolation element 622 is an AC-grounded, conductive, parasitic element that resonates in two non-overlapping frequency bands, F1 and F2. The isolation element 622 further includes a choke element 616 including circuitry that presents an open circuit for surface current oscillating within the first frequency band F1 and presents a short circuit for surface current oscillating within the second frequency band F2. Example circuitry for the choke element 616 is shown in exploded view 620. In particular, two different example circuits 624 and 626 are shown. Capacitors (e.g., a capacitor 628) of the choke element 616 are made tunable so that the isolation between the antennas is adaptable. The isolator assembly 602 also includes a selection circuit 618 that can act as a high impedance network at frequencies other than F1 and F2. The selection circuit 618 includes an inductor 631 that allows the isolation element 622 to have a shorter end-to-end length than in an implementation without the inductor. In addition, the selection circuit 618 includes a tunable capacitor 629 that permits dynamic alteration of the frequencies F1 and F2, at which isolation occurs.

Figure 7:
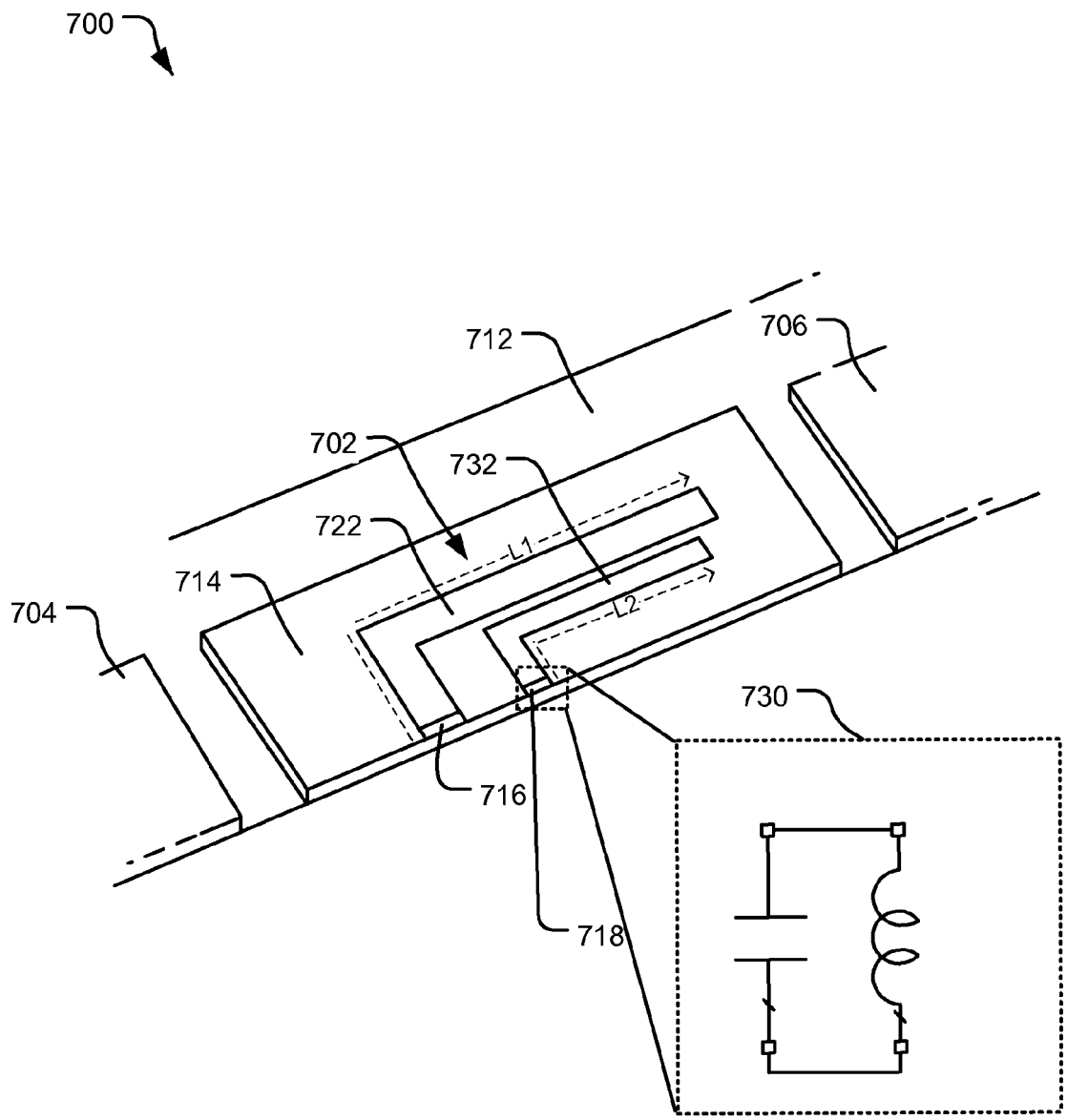
FIG. 7 illustrates another example isolator assembly positioned between two or more antennas on a surface of an electronic device.

FIG. 7 illustrates another example isolator assembly 702 positioned between antennas 704 and 706 on a surface 712 of an electronic device 700. Other antennas (not shown) may also be included on the surface 712. At least one antenna on the surface 712 emanates a radio signal within a first frequency band F1 and at least one antenna on the surface 712 emanates a radio signal within a second frequency band F2 that does not overlap the first frequency band F1.

The isolator assembly 702 includes a first isolation element 722 and a second isolation element 732. The first isolation element 722 and the second isolation element 732 are each AC-grounded, conductive elements with a length associated with a mode of resonance. In FIG. 7, the first isolation element 722 and the second isolation element 732 are shown as L-shaped; however, other shapes are also contemplated. The first isolation element 722 resonates at frequencies of the first frequency band F1. An end-to-end length L1 of the first isolation element 722 is thus associated with the distance c/F1, where c is the speed of light. In one implementation, the distance L1 is substantially equal to ¼ of c/F1. In other implementations, this distance is shortened by use of an inductor in a selection circuit 716. The second isolation element 732 resonates at frequencies of the second frequency band F2. An end-to-end length L2 of the second isolation element 732 is associated with the distance c/F2, where c is the speed of light. In one implementation, the distance L2 is substantially equal to ¼ of c/F2. In other implementations, this distance is shortened by use of an inductor in a selection circuit 718. Other implementations are also contemplated.

One purpose of the selection network 716 and the selection network 718 is to help prevent interference (e.g., coupling) between the first isolation element 722 and the second isolation element 732. In FIG. 7, the second selection network 718 is a parallel circuit (as shown in exploded view 730) that has a maximum impedance at the first frequency F1. The first selection network 716 may similarly include a parallel circuit with a maximum impedance at around the second frequency F2. Other designs are also contemplated.

When an antenna of the electronic device 700 emanates a radio signal in the first frequency band F1, current oscillating within the first frequency band F1 forms along the surface 712. The second isolation element 732 (which resonates in the frequency band F2) is effectively deselected by the selection circuit 718. Rather than terminating at the second isolation element 732, the surface current terminates at the first isolation element 722.

When an antenna of the electronic device 700 emanates a radio signal in the second frequency band F2, current oscillating within the second frequency band F2 forms along the surface 712. The first isolation element 732 (which resonates in the frequency band F1) is effectively deselected by the selection circuit 716. Rather than terminating at the first isolation element 722, the surface current terminates at the second isolation element 732.

Figure 8:
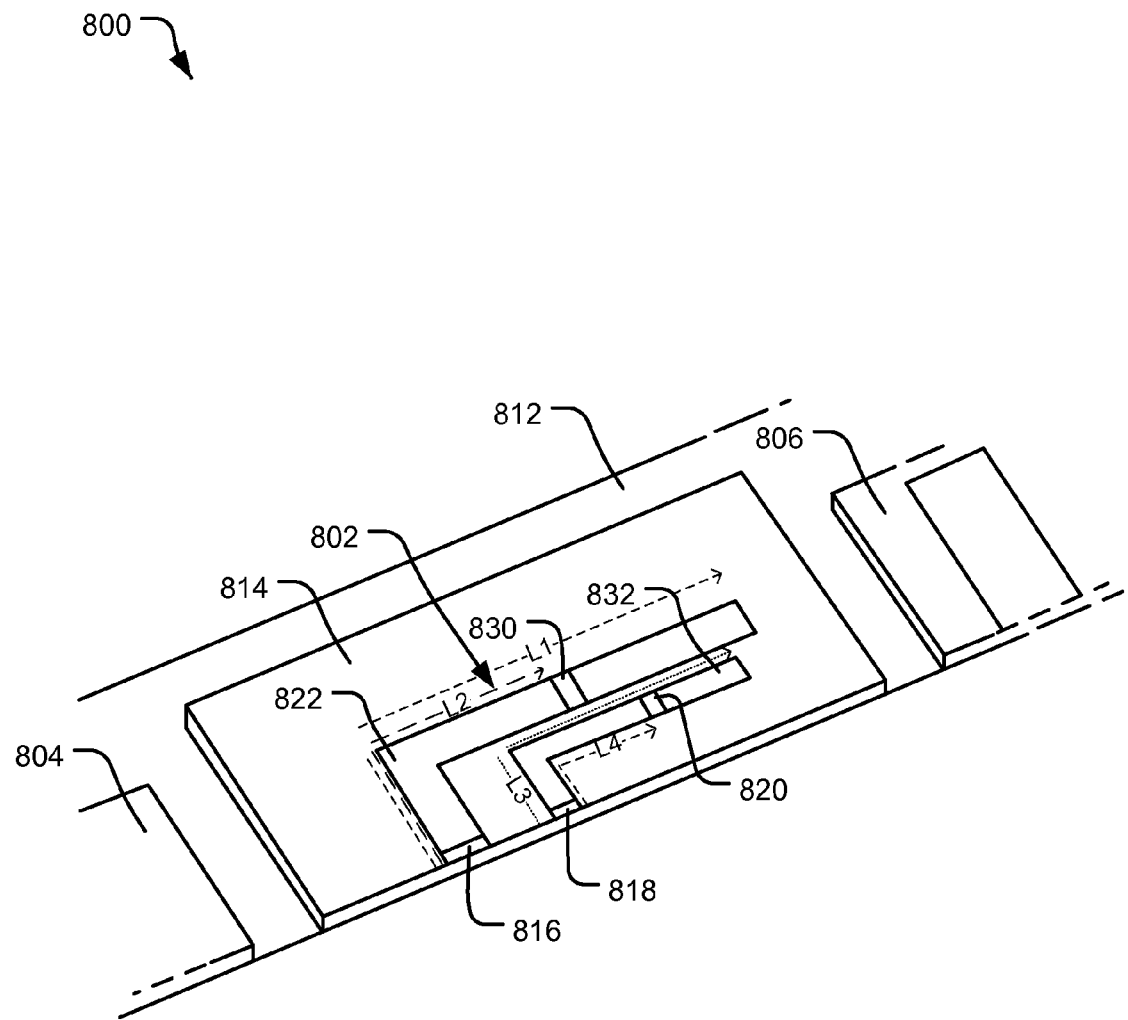
FIG. 8 illustrates another example isolator assembly on a surface of an electronic device.

FIG. 8 illustrates another example isolator assembly 802 on a surface 812 of an electronic device 800. The electronic device 800 includes antennas 804 and 806 positioned on opposite sides of the isolator assembly 802. Although not shown, the surface 812 may include additional antenna elements positioned on one or both sides of the isolator assembly 802. Of all of the antennas on the surface 812, at least one operates in a first frequency band F1, at least one operates in a second frequency band F2, at least one operates in a third frequency band F3, and at least one operates in a fourth frequency band F4, where each of F1, F2, F3, and F4 are non-overlapping frequency bands.

The isolator assembly 802 includes a first isolation element 822 and a second isolation element 832. The first isolation element 822 and the second isolation element 832 are AC-grounded, conductive, parasitic elements that each resonate at two different non-overlapping frequency bands. The first isolation element 822 resonates in the bands F1 and F2, while the second isolation element 832 resonates in the bands F3 and F4. The first isolation element 822 and the second isolation element 832 are shown as L-shaped; however, other shapes are also contemplated.

An end-to-end length L1 of the first isolation element 822 is associated with the distance c/F1, where c is the speed of light. The first isolation element 822 also includes a choke element 830 that divides out another length L2 from the end-to-end length L1, where L2 is associated with a distance c/F2. Similarly, an end-to-end length L3 of the second isolation element 832 is associated with a distance c/F3. The second isolation element 832 also includes a choke element 820 that divides out another length L4 from the end-to-end length L3, where L4 is associated with a distance c/F4.

A first selection network 816 is included in the first isolation element 822 and a second selection network 818 is included in the second isolation element 832. One purpose of the first selection network 816 and the second selection network 818 is to help prevent interference (e.g., coupling) between the first isolation element 822 and the second isolation element 832. In one implementation, the second selection network 818 is a parallel circuit that presents a high impedance in the resonance frequency bands of F1 and F2 of the first isolation element 822. As a result, the second isolation element 832 is "deselected" from an isolation operation when current oscillating at frequencies of F1 or F2 flows on the surface 812. In such case, the first isolation element 822 performs the isolation operation.

In the same or another implementation, the first selection network 816 is a parallel circuit that presents a high impedance in the resonance frequency bands F3 and F4 of the second isolation element 832. As a result, the first isolation element 822 is "deselected" from an isolation operation when current oscillating at frequencies of F3 or F4 flows on the surface 812. In such case, the second isolation element 832 performs the isolation operation.

In effect, the isolator assembly 802 provides isolation for four non-overlapping frequency bands.

Figure 9:
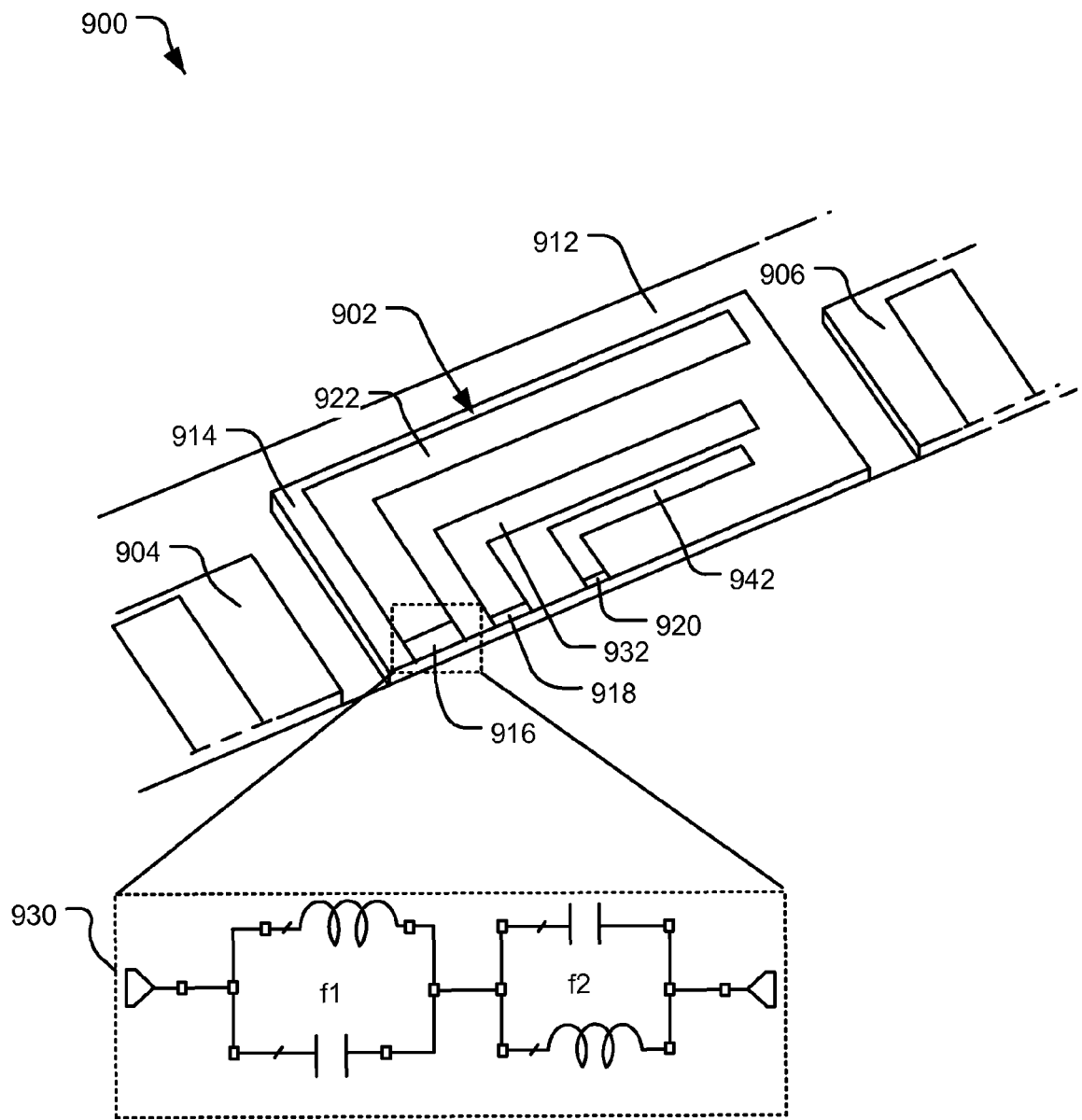
FIG. 9 illustrates yet another example isolator assembly on a surface of an electronic device.

FIG. 9 illustrates yet another example isolator assembly 902 on a surface 912 of an electronic device 900. The electronic device 900 includes two antennas 904 and 906 positioned on opposite sides of the isolator assembly 902. Although not shown, the surface 912 may include additional antenna elements positioned on one or both sides of the isolator assembly 902. Of all of the antennas on the surface 912, at least one antenna operates within each of three non-overlapping frequency bands: F1, F2, and F3.

The isolator assembly 902 includes three isolation elements including a first isolation element 922, a second isolation element 932, and a third isolation element 942. Each of the isolation elements is an L-shaped, conductive, AC-grounded parasitic element that resonates at a frequency associated with its length. Shapes other than "L-shaped" are also contemplated.

An end-to-end length of the first isolation element 922 is associated with the distance c/F1, where c is the speed of light; an end-to-end length of the second isolation element 932 is associated with a distance c/F2; and an end-to-end length of the third isolation element 942 is associated with a distance c/F3. As a result, the first isolation element 922 resonates in the frequency band F1, the second isolation element 932 resonates in the frequency band F2, and the third isolation element resonates in the frequency band F3.

A first selection network 916 is included in the first isolation element 922; a second selection network 918 is included in the second isolation element 932; and a third selection network 920 is included in the third isolation element 942. One purpose of the first selection network 916, the second selection network 918, and the third selection network 920 is to help prevent interference (e.g., coupling) between the first isolation element 922, the second isolation element 932, and the third isolation element 942.

In FIG. 9, the first selection network 916 is a parallel circuit that presents a high impedance for current oscillating in the frequency bands F2 or F3. As a result, the first isolation element 932 is effectively "deselected" from an isolation operation when current oscillating at frequencies of F2 or F3 flows on the surface 912. Example circuitry for the first selection network 916 is shown in exploded view 930. Other implementations are also contemplated.

The second selection network 918 is a parallel circuit that presents a high impedance for current oscillating in the frequency bands F1 and F3. As a result, the second isolation element 932 is effectively deselected from an isolation operation when current oscillating in the frequency bands F1 or F3 flows on the surface 912.

The third selection network 920 is a parallel circuit that presents a high impedance at the resonance frequency bands F1 and F2. As a result, the third isolation element 942 is effectively deselected from an isolation operation when current oscillating within the frequency bands F1 or F2 flows on the surface 912. In effect, the isolator assembly 902 provides isolation between antennas operating in three different non-overlapping frequency bands.

In another implementation, one or more of the isolator elements is modified to resonate in two different frequency bands (e.g., such as by incorporation of a choke element, as shown in FIGS. 2, 3, 6, and 8). In this way, the isolator assembly 902 may provide isolation between antennas operating in up to six different non-overlapping frequency bands. In still other implementations, additional isolator elements are added to the isolator assembly to provide isolation at additional non-overlapping frequencies.

Figure 10:
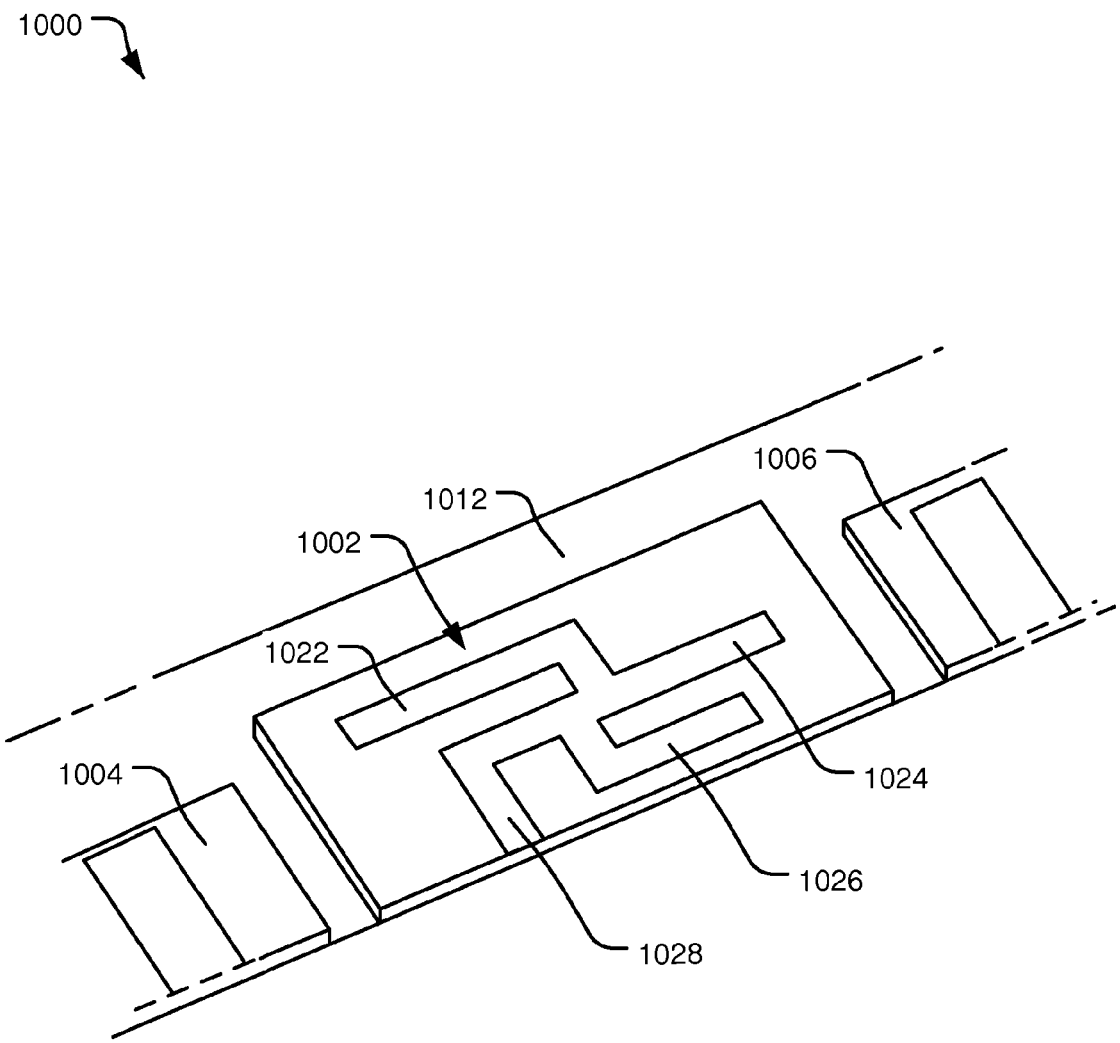
FIG. 10 illustrates another example isolator assembly on a surface of an electronic device.

FIG. 10 illustrates another example isolator assembly 1002 on a surface 1012 of an electronic device 1000. The electronic device 1000 includes two antennas 1004 and 1006 positioned on opposite sides of the isolator assembly 1002. Although not shown, the surface 1012 may include additional antenna elements positioned on one or both sides of the isolator assembly 1002. The isolator assembly 1002 includes a multi-branch isolation element 1022 with a different resonant frequency band associated with each of three L-shaped interconnected branches. A first branch 1024 resonates in a first frequency band; a second branch 1026 resonates in a second frequency band; and a third branch 1028 resonates in a third frequency band. In other implementations, the isolation element 1002 may have a fewer or greater than three interconnected branches. The interconnected branches may or may not be L-shaped. Some implementations may include multiple, multi-branch isolation elements.

Figure 11:
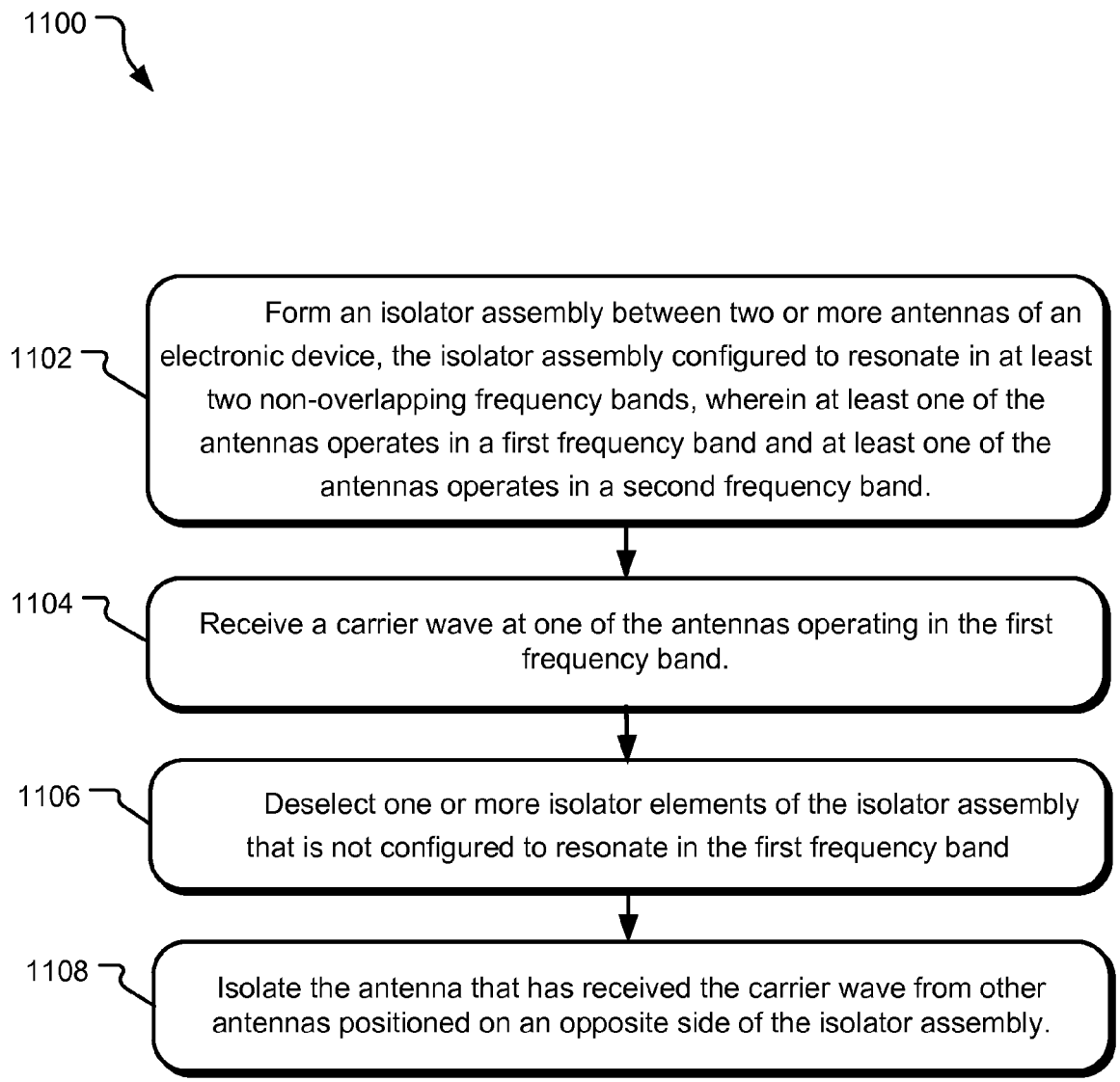
FIG. 11 illustrates example operations for isolating antennas using an isolator assembly.

FIG. 11 illustrates example operations 1100 for using an isolator assembly. A forming operation 1102 forms an isolator assembly on an electronic device between two or more antennas. The isolator assembly is configured to resonate in a first frequency band and a second frequency band and includes at least one isolator element, which is a conductive, parasitic resonating element. In one implementation, the isolator assembly includes a single isolator element that resonates in two or more non-overlapping frequency bands. In another implementation, the isolator assembly includes multiple isolator elements and each element resonates in a single frequency band that does not overlap a resonant frequency band of the other isolator elements. In still other implementations, the isolator assembly includes multiple isolator elements and one or more of the isolator elements resonates in two non-overlapping frequency bands.

A receiving operation 1104 receives, at one or more antennas, a carrier wave oscillating in a first frequency band. Responsive to the receiving operation 1104, a surface current with an oscillation frequency in the first frequency band forms on the electronic device.

If the isolator assembly includes two or more separate isolator elements, a deselection operation 1106 deselects one or more of the isolator elements that are not configured to resonate in the first frequency band. The deselection operation 1106 may be performed, for example, by circuitry that presents a high impedance for current oscillating in the first frequency band.

An isolation operation 1108 isolates the antenna that received the carrier wave from any antennas positioned on the opposite side of the isolator assembly. In particular, the isolation operation 1108 is performed by an isolator element that resonates at in the first frequency band. Other implementations are also contemplated.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. Apparatus comprising:
    an isolator assembly that provides isolation between two antennas in multiple non-overlapping frequency bands, the isolator assembly including a resonating conductive isolation element and including a selection network configured to select one of the multiple non-overlapping frequency bands for an isolation operation, wherein the length of the conductive resonating isolation element measures less than ¼ of the wavelength of the frequency band selected for the isolation operation.

2. The apparatus of claim 1, wherein the isolator assembly is configured to provide isolation in two different frequency bands.

3. The apparatus of claim 1, wherein the selection network is a choke element that presents a short circuit for a first frequency band and an open circuit for a second frequency band.

4. The apparatus of claim 1, wherein the isolator assembly includes multiple isolator elements separated from one another, each isolator element configured to isolate in a different, non-overlapping frequency band.

5. The apparatus of claim 4, wherein at least one of the multiple isolator elements provides isolation in two non-overlapping frequency bands.

6. The apparatus of claim 4, wherein the selection network is a circuit that deselects at least one of the multiple isolator elements based on frequency of a received surface current.

7. The apparatus of claim 1, wherein the isolator assembly includes one or more tunable capacitors to adaptively tune a mode of resonance of the isolator assembly.

8. The apparatus of claim 1, wherein the selection network prevents coupling between separate isolation elements of the isolation assembly.

9. The apparatus of claim 1, further comprising:
    a first isolator element that provides isolation in a first frequency band, the first isolator element being separated from a second isolator element that provides isolation in a second frequency band, the selection network being configured to deselect the second isolator element responsive to receipt of surface current oscillating in the first frequency band.

10. The apparatus of claim 9, wherein the selection network presents a high impedance in the first frequency band.

11. A method comprising:
    selectively resonating an isolator assembly including a resonating conductive isolation element in a frequency band, the isolator assembly including a selection network configured to select the frequency band from multiple non-overlapping frequency bands, wherein the length of the conductive resonating isolation element measures less than ¼ of the wavelength of the frequency band selected for the isolation operation.

12. The method of claim 11, wherein the isolator assembly is configured to provide isolation in two different frequency bands.

13. The method of claim 11, wherein the selection network is a choke element that presents a short circuit for a first frequency band and an open circuit for a second frequency band.

14. The method of claim 11, wherein the isolator assembly includes multiple isolator elements separated from one another, each isolator element configured to isolate in a different one of the multiple non-overlapping frequency bands.

15. The method of claim 14, wherein at least one of the multiple isolator elements provides isolation in two non-overlapping frequency bands.

16. The method of claim 14, wherein the selection network is a circuit that deselects at least one of the multiple isolator elements based on frequency of a received surface current.

17. The method of claim 11, wherein the isolator assembly includes one or more tunable capacitors to adaptively tune a resonant mode of the isolator assembly.

18. The method of claim 11, wherein the isolator assembly further includes a first isolator element that provides isolation in a first frequency band, the first isolator element separated from a second isolator element that provides isolation in a second frequency band, the selection network being configured to deselect the second isolator element responsive to receipt of surface current oscillating in the first frequency band.

19. The method of claim 18, wherein the selection network presents a high impedance in the first frequency band.

20. An apparatus comprising:
    an isolator assembly that provides isolation between two antennas in multiple non-overlapping frequency bands, the isolator assembly including multiple interconnected conductive branches, each of the interconnected branches having a length measuring less than ¼ of the wavelength of one of the multiple non-overlapping frequency bands.

* * * * *